(12) United States Patent
Florence et al.

(10) Patent No.: US 7,226,681 B2
(45) Date of Patent: Jun. 5, 2007

(54) FUEL CELL INSULATING HEAT EXCHANGER

(75) Inventors: Stephen Florence, Calgary (CA); Joseph English, Calgary (CA); Bryce Sharman, Calgary (CA); Glenn Price, Calgary (CA)

(73) Assignee: Versa Power Systems, Ltd.

( * ) Notice: Subject to any disclaimer, the term of this patent is extended or adjusted under 35 U.S.C. 154(b) by 284 days.

(21) Appl. No.: 10/604,030

(22) Filed: Jun. 23, 2003

(65) Prior Publication Data

US 2004/0086765 A1 May 6, 2004

Related U.S. Application Data

(60) Provisional application No. 60/319,340, filed on Jun. 21, 2002.

(51) Int. Cl.
  H01M 8/04 (2006.01)
  F28D 9/00 (2006.01)
(52) U.S. Cl. .............................. 429/26; 429/34; 165/57; 165/66
(58) Field of Classification Search .................. 429/26, 429/34, 38, 39; 165/57, 66
See application file for complete search history.

(56) References Cited

U.S. PATENT DOCUMENTS

| | | | |
|---|---|---|---|
| 3,096,255 A * | 7/1963 | Redenbaugh | 165/66 X |
| 4,898,792 A * | 2/1990 | Singh et al. | 429/31 X |
| 5,340,664 A | 8/1994 | Hartvigsen | |
| 5,573,867 A | 11/1996 | Zafred et al. | |
| 6,024,859 A | 2/2000 | Hsu | |
| 6,485,852 B1 | 11/2002 | Miller et al. | |
| 6,551,734 B1 | 4/2003 | Simpkins et al. | 429/26 |
| 6,794,074 B2 * | 9/2004 | Vu et al. | 429/34 X |
| 6,843,311 B2 * | 1/2005 | Evans et al. | 165/167 |
| 2001/0049035 A1 | 12/2001 | Haltiner, Jr. et al. | |
| 2005/0014054 A1 * | 1/2005 | Champion | 429/34 |

FOREIGN PATENT DOCUMENTS

| | | |
|---|---|---|
| DE | 43 19 411 A1 | 12/1994 |
| EP | 0 889 537 B1 | 7/1997 |
| EP | 1 202 366 A2 | 10/2001 |
| WO | WO 95/10126 | 4/1995 |

* cited by examiner

Primary Examiner—Stephen J. Kalafut
(74) Attorney, Agent, or Firm—Bennett Jones LLP

(57) ABSTRACT

An enclosure for a fuel cell stack for insulating the hot zone of the fuel cell stack and for exchanging heat from the fuel cell stack to a reactant that passes through the enclosure to be used by the fuel cell stack. The enclosure comprises at least one chamber having an intake means for the reactant and an exhaust means for passing the reactant to the fuel cell stack. In one embodiment there are three layered chambers.

7 Claims, 6 Drawing Sheets

FUEL CELL INSULATING HEAT EXCHANGER

CROSS REFERENCE TO RELATED APPLICATIONS

This application claims the priority of U.S. provisional patent application 60/319,340 filed on Jun. 21, 2002.

BACKGROUND OF INVENTION

The present invention relates to a fuel cell apparatus which combines an insulating and a heat exchanging function.

Solid oxide fuel cells operate at high temperature and typically have a "hot box" or "hot zone" which houses the fuel cell stacks, reforming apparatus, heat exchangers and other equipment that need to be at the operating temperature of the fuel cells. This hot box is insulated to reduce energy losses and to prevent thermal shocks to the fuel cell stacks. Usually, this insulation consists of thick blankets of alumina fibers, or asbestos. This is undesirable from a health perspective, as the blankets must be handled carefully to prevent the release of fibers of the insulating material, as these fibers can be hazardous or carcinogenic. In addition, the protective equipment required to be worn by workers handling this material is expensive and cumbersome.

Thick insulating blankets are undesirable for a potential consumer product, as they occupy a large amount of space, and the product packaging should be as small as possible, especially for transportation applications. Further, incorporating heat exchangers and other devices inside the hot box area necessitates a larger hot box. This has a larger surface area and therefore more thermal loss than a smaller hot box, which impairs efficiency.

Additionally, the use of insulating blankets does not permit convenient control of the stack or hot zone temperature as the insulation is constant and not variable. It may be desirable to increase or decrease the insulation around the hot zone to regulate the stack temperature in a stack control system. It may be further desirable to include a method of cooling the stack as part of the stack control system.

Therefore there is a need in the art to overcome the difficulties of the prior art, and provide a system that may allow the hot box to be made smaller and which may permit cooling of the stack and/or a variable insulating effect.

SUMMARY OF INVENTION

The present invention is directed to an insulating enclosure for a fuel cell stack. The enclosure also provides for heat exchange for a reactant which is moved through the enclosure to be used by the fuel cell stack or in a fuel processor or reformer.

Accordingly, in one aspect, the invention may comprise a fuel cell stack enclosure which fully or partially encloses a fuel cell stack, or stands adjacent to a fuel cell stack, comprising at least one chamber having intake means for accepting a reactant and exhaust means for passing the reactant to the fuel cell stack. The chamber receives heat from the fuel cell stack and transfers it to the reactant. As a result, the reactant is preheated and the enclosure insulates the fuel cell stack or hot zone.

In one embodiment, the enclosure comprises two layered chambers, comprising an inner chamber adjacent the fuel cell stack and an exterior outer chamber. In a preferred embodiment, there are three layered chambers, with an intermediate chamber disposed between the inner and outer chambers. Reactant flow is directed into the outer chamber, then into the intermediate chamber, then into the inner chamber and finally into the fuel cell stack, directly or indirectly.

In one embodiment, the fuel cell stack enclosure is cylindrical having at least one annular chamber with a substantially circular cross-sectional configuration. In another embodiment, the fuel cell stack enclosure comprises a planar or multi-planar enclosure which is adjacent to or surrounds the stack and other devices in the hot zone. In one preferred embodiment, the enclosure comprises three sides.

In one embodiment, the invention comprises a fuel cell stack enclosure having an upper end and a lower end, and comprising an inner cylindrical shell and an outer cylindrical shell, which together define at least one annular space between them. In one embodiment, the enclosure comprises:

(a) at least three closed concentric cylindrical shells including an outer shell, an inner shell and at least one intermediate shell;

(b) wherein the outer shell and the at least one intermediate shell define a first annular chamber between them, and the inner shell and the at least one intermediate shell define a second annular chamber between them;

(c) an intake port defined by the outer shell for providing fluid communication from the exterior of the enclosure to the first annular chamber;

(d) a cross-over port defined by the intermediate shell for providing fluid communication between the first annular chamber and the second annular chamber;

(e) an outlet port defined by the inner shell for providing fluid communication between the second annular chamber and the interior space of the enclosure.

In one embodiment, the enclosure is formed of two semi-cylindrical halves comprising means for providing fluid communication between the first annular chambers of each half, and fluid communication between the second annular chambers of each half.

BRIEF DESCRIPTION OF DRAWINGS

The invention will now be described by way of an exemplary embodiment with reference to the accompanying simplified, diagrammatic, not-to-scale drawings. In the drawings.

DETAILED DESCRIPTION

Figure 1:
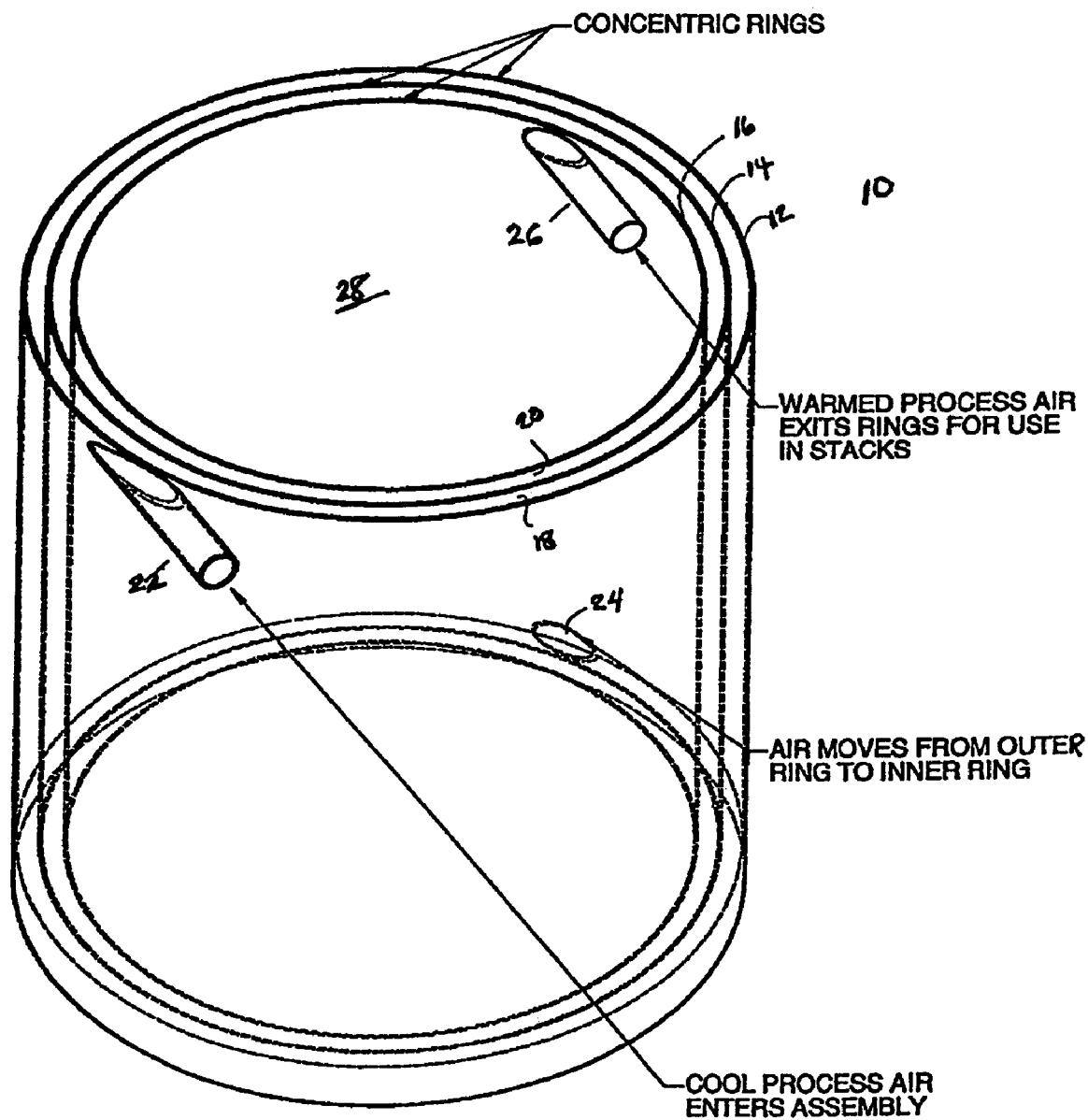
FIG. 1 is a schematic representation of one embodiment of the present invention.

The present invention provides for a fuel cell stack enclosure. When describing the present invention, all terms not defined herein have their common art-recognized meanings.

The enclosure (10) may fully or partially enclose a fuel cell stack or the hot zone of a fuel cell system. The enclosure is intended to serve two primary functions. First, a reactant such as air is passed through the enclosure to be preheated prior to use in the stack itself. Second, the enclosure insulates the stack or the hot zone including the stack. Furthermore, in one embodiment, the enclosure may form part of a control system to regulate thermal management of the stack and fuel cell system. Two general embodiments are illustrated and described herein. A first embodiment comprises a cylindrical enclosure. A second embodiment comprises a three-sided box enclosure. The present invention is not intended to be limited to cylindrical or three-sided box enclosures but rather may include any geometrical configuration having the requisite heat exchanging and insulating functionality.

In general terms, in one embodiment, the apparatus (10) comprises 3 concentric cylindrical shells (12, 14, 16) which thereby define two concentric chambers (18, 20) which are closed top and bottom by circular plates (not shown). Therefore, the chambers are gas-tight except for a port (22) on the outer shell (12), a crossover port on the intermediate shell (14) and inner port (26) on the inner shell (16). The fuel cell stack (not shown) and hot zone is contained within the inner shell (16).

One skilled in the art will appreciate that when additional concentric shells are provided, additional concentric chambers are created. Furthermore, one skilled in the art may appreciate that a single annular chamber created between an inner and an outer shell will also provide heat exchanging and insulating functionality. Such embodiments are within the scope of the present invention.

Cool ambient air enters, is pumped into, or is drawn by a vacuum into chamber (18) via port (22) and circulates through chamber (18) to crossover port (24) Crossover port (24) allows the air to transfer from the outer chamber (18) to the inner chamber (20). The crossover port is preferably a flattened oval opening. The air is progressively warmed as it circulates and travels inward, as the hot fuel cell stacks are located inside the concentric rings, indicated by (28) and transmit radiant heat to the enclosure (10). Once the air has traveled inward to the center of the apparatus, it exits through port (26) and is directed to the stacks or other apparatus as necessary. The warmed air may be directed to the air electrode manifolds or may be directed to additional high-temperature heat exchangers to be heated further.

In one embodiment, the ports (22, 24, 26) are configured to promote relatively smooth air flow within the chambers in a circular and top-to-bottom direction. Therefore, the inlet port (22) is aligned tangentially to the outer shell (12) to promote clockwise air flow as shown in FIG. 1. It is also placed near the upper end of the apparatus (10). The crossover port (24) is positioned on the opposite side and is placed near the bottom end of the apparatus. A small deflector (not shown) may direct air passing through the cross-over port horizontally in one direction. The exit port (26) is located near the top of the apparatus.

The apparatus (10) serves at least two functions, that of preheating the incoming air for use in the fuel cell stacks, and that of insulating the central hot zone (28) by at least one air gap, and preferably a plurality of air gaps, between the hot zone at the center (28) and the outside, as air is an excellent insulator. This may reduce the need to wrap the apparatus (10) in thick heavy insulating blankets. These blankets are typically made from alumina or asbestos fibres, both to be fireproof and to withstand the high temperature encountered. As referred to above, the use of these fibres is not advantageous.

In addition, the apparatus may form part of a control system which may control stack temperature by allowing control of the amount of radiant heat removed from the stack. Greater flows of cool air will have the effect of cooling the stack or the hot zone. As well, a greater flow of cool air will increase the insulating effect of the enclosure, leaving the temperature of the outside surface of the enclosure cooler.

In an alternative embodiment, the inner or outer chambers, or both, are divided into a spiral conduit by a spiral inclined plane divider. This may ensure that incoming air follows a long path within the chamber, maximizing heat transfer. However, the complexity and cost of the apparatus is increased.

Figure 2:
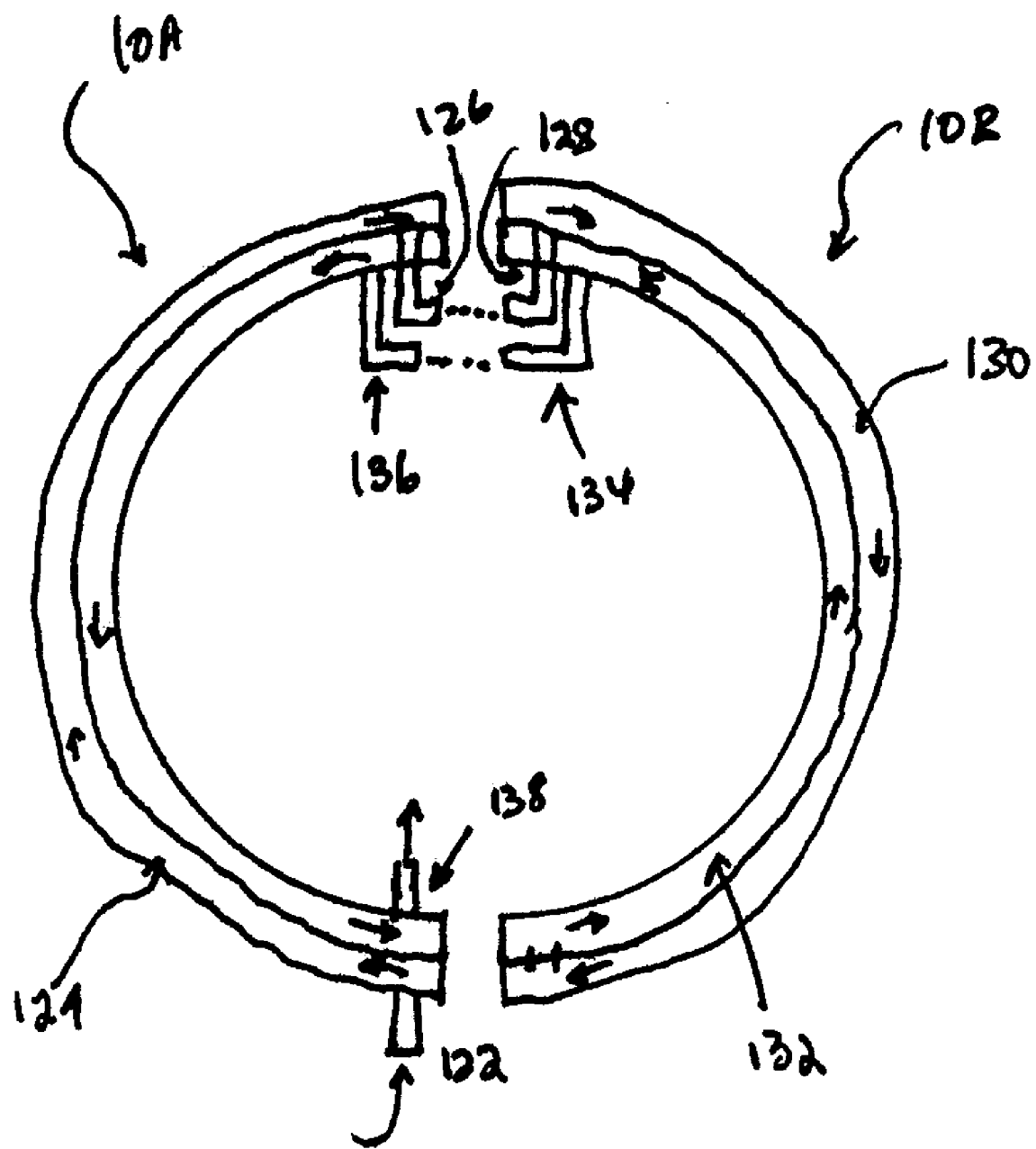
FIG. 2 is a horizontal cross-section of another embodiment.
Figure 3:
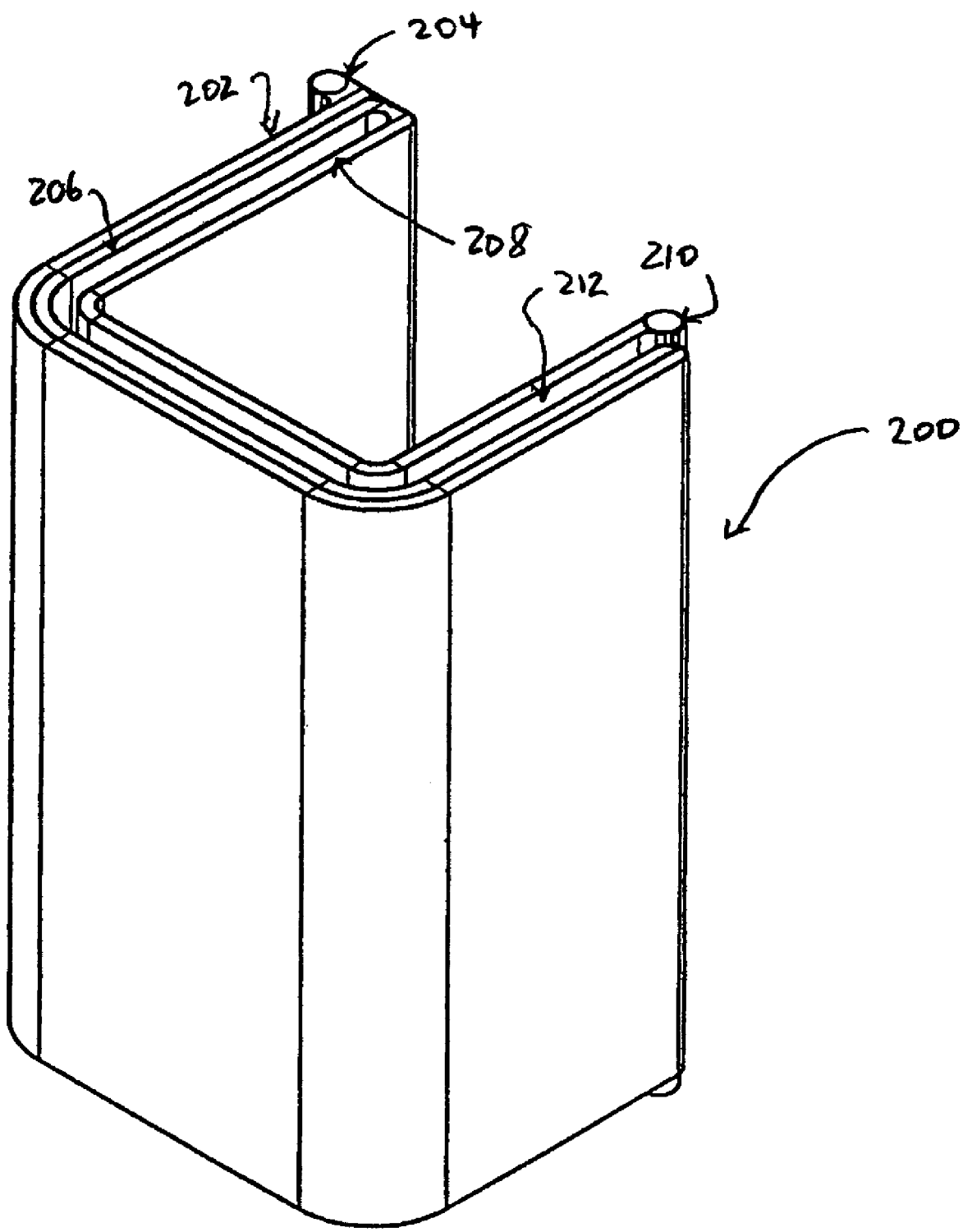
FIG. 3 is a perspective view of an alternative embodiment of the invention
Figure 4:
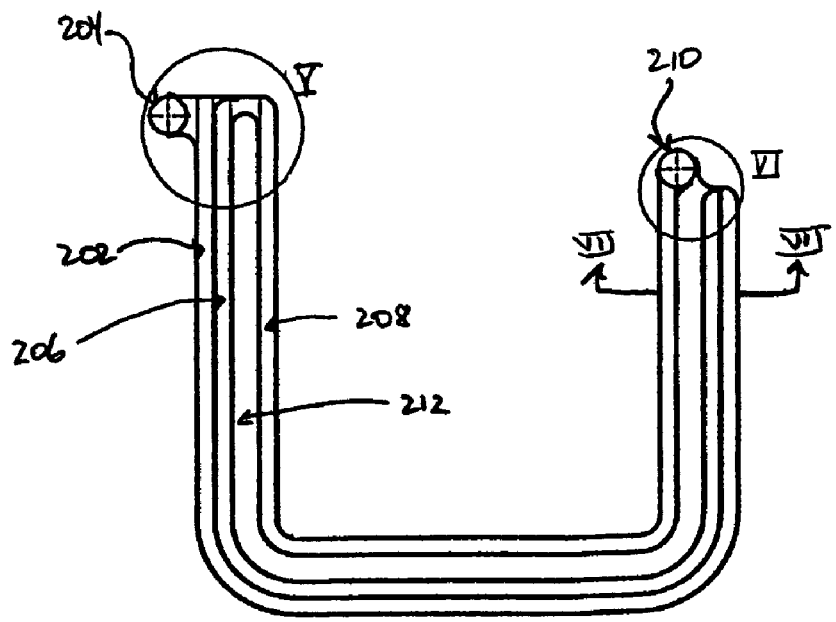
FIG. 4 is a horizontal cross-section of the embodiment shown in FIG. 3.

In one embodiment, the apparatus is divided into two semi-cylindrical halves, as is shown in FIG. 2. This configuration permits convenient assembly of the apparatus around the hot zone of a fuel cell stack assembly. Accordingly, the inner and outer chambers are divided and must be connected as shown in FIG. 2. As is apparent, the flow of air in the outer chamber of each half is countercurrent to the airflow in the inner chamber. Air enters one half (10A) of the apparatus through conduit (122), through the outer chamber (124) and out port (126), which connects with inlet port (128) of the other half (10B). The air continues through the outer chamber (130) and passes into the inner chamber (132), where the air reverses flow and flows countercurrent to the outer chambers (130, 124) via bypass ports (134, 136) and then exits into the interior of the apparatus (10) through outlet (138).

In one embodiment, a thin insulating layer (not shown) is attached to the interior surface of the apparatus (10) to enhance the insulating function and in an effort to maintain an even temperature on the inner surface of the apparatus (10). One skilled in the art may vary the thickness of, or eliminate, the insulating layer to maximize or minimize the insulating function. Of course, increasing insulation on the inside surface will affect the heat exchange efficiency. In another the exterior of the apparatus may be insulated, which will increase both insulating and heat exchange functions of the apparatus.

The two halves of the apparatus are clamped and sealed together when assembled around a fuel cell stack or stacks.

In an alternative embodiment, the fuel cell enclosure (200) includes three layered air chambers and functions as a radiative heat exchanger. The inner surface of the enclosure is directly exposed to the fuel cell stack (not shown) and receives radiative heat energy. In the embodiment illustrated, the enclosure forms a three-sided enclosure comprising three substantially planar sections. Accordingly, in horizontal cross-section, the enclosure (200) forms a "U" shaped apparatus.

Low temperature air is directed into the outer chamber (202) at one end of the enclosure through an intake manifold (204) which may comprise a pipe having a plurality of distribution outlets. Low temperature air may be ambient air or may have been preheated upstream from the enclosure. The air then passes around the enclosure to the opposite end and moves into the middle or intermediate chamber (206) where it returns to the first end. Finally, the air passes into the inner chamber (208, which is directly exposed to the stack. As will be appreciated by one skilled in the art, the chambers (202, 206, 208) are not separate and distinct chambers but rather are portions of a continuous flow pathway which is contained within the enclosure.

The heated air then exits the enclosure from an exhaust manifold (210) which may comprise a pipe having a plurality of openings through which the heated air exits the inner chamber (208) into the exhaust manifold (210). The heated air may then be directed into the stacks, either directly or through other components of the system.

In a preferred embodiment, an insulating layer (212) is provided between the inner and middle chambers. The insulating layer increases the overall insulating value of the enclosure and permits greater heat exchange into the incoming air stream.

As will be apparent to one skilled in the art, greater air flow through the enclosure (200) will result in some cooling of the hot box and the fuel cell stack and an increase in the insulating effect. Reduced air flow through the enclosure (200) will result in a reduced insulating effect. These properties may be advantageously utilized in a fuel cell system of thermal management and control.

Figure 5:
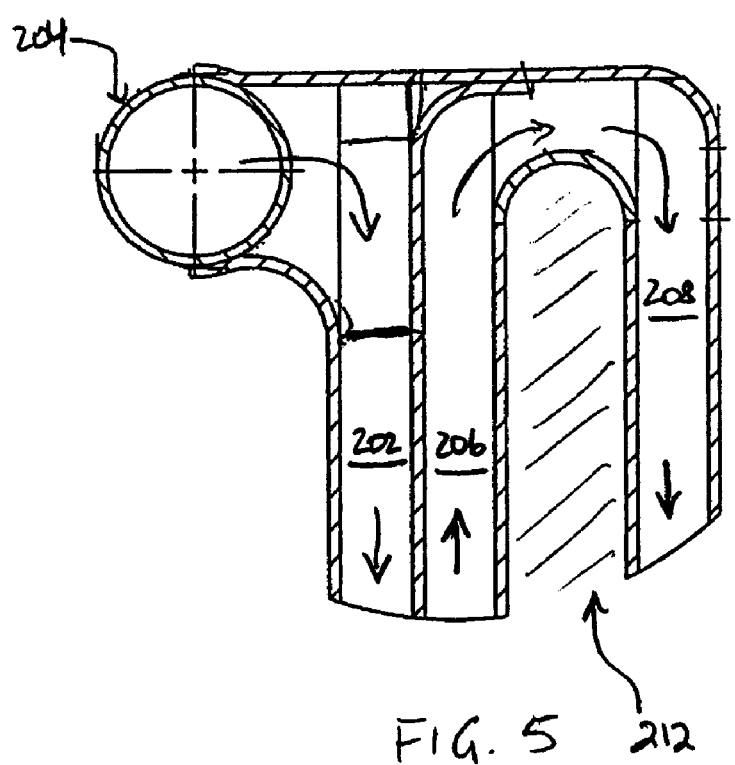
FIG. 5 is a detailed view of V shown in FIG. 4.
Figure 6:
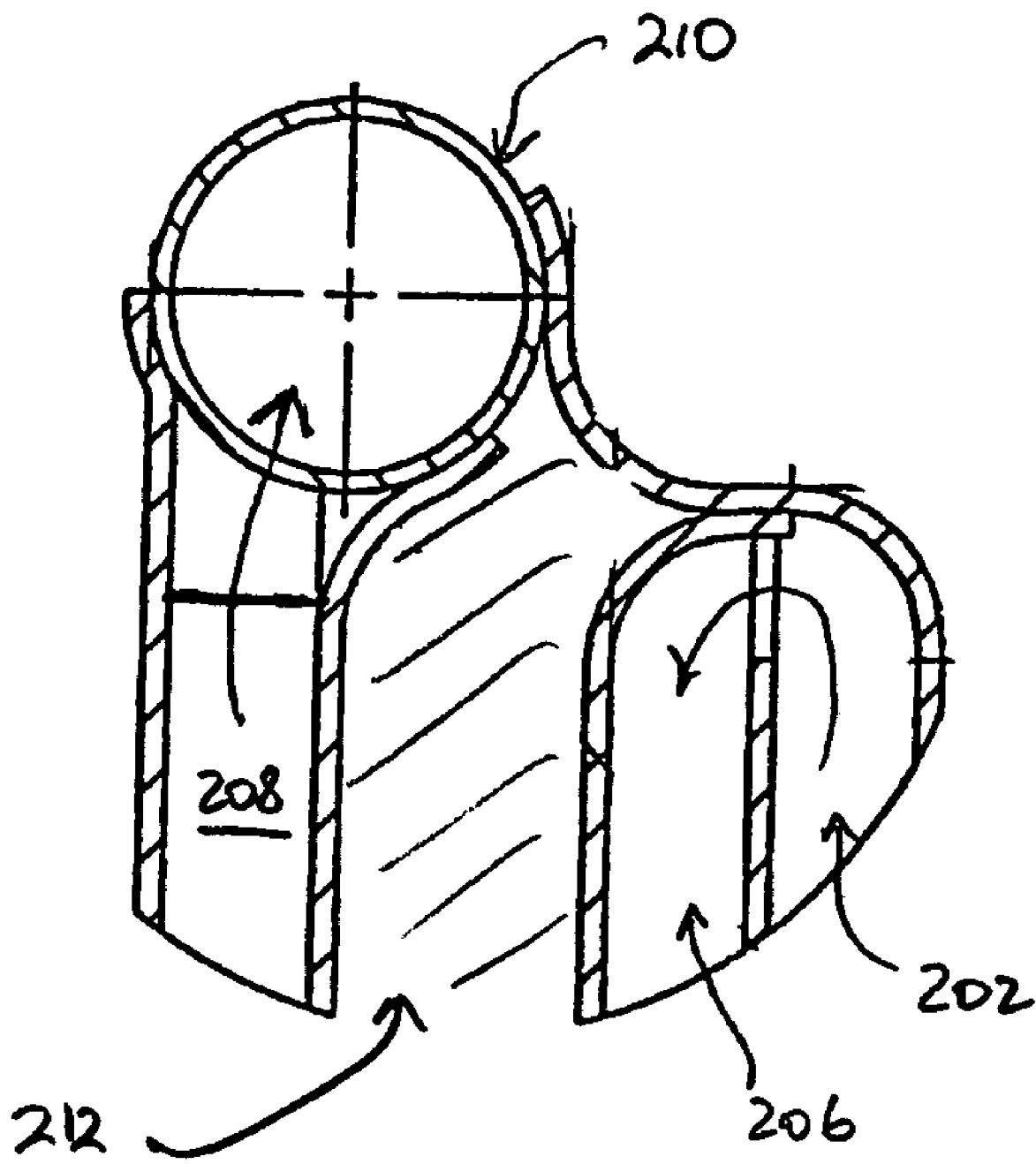
FIG. 6 is a detailed view of VI shown in FIG. 4.
Figure 7:
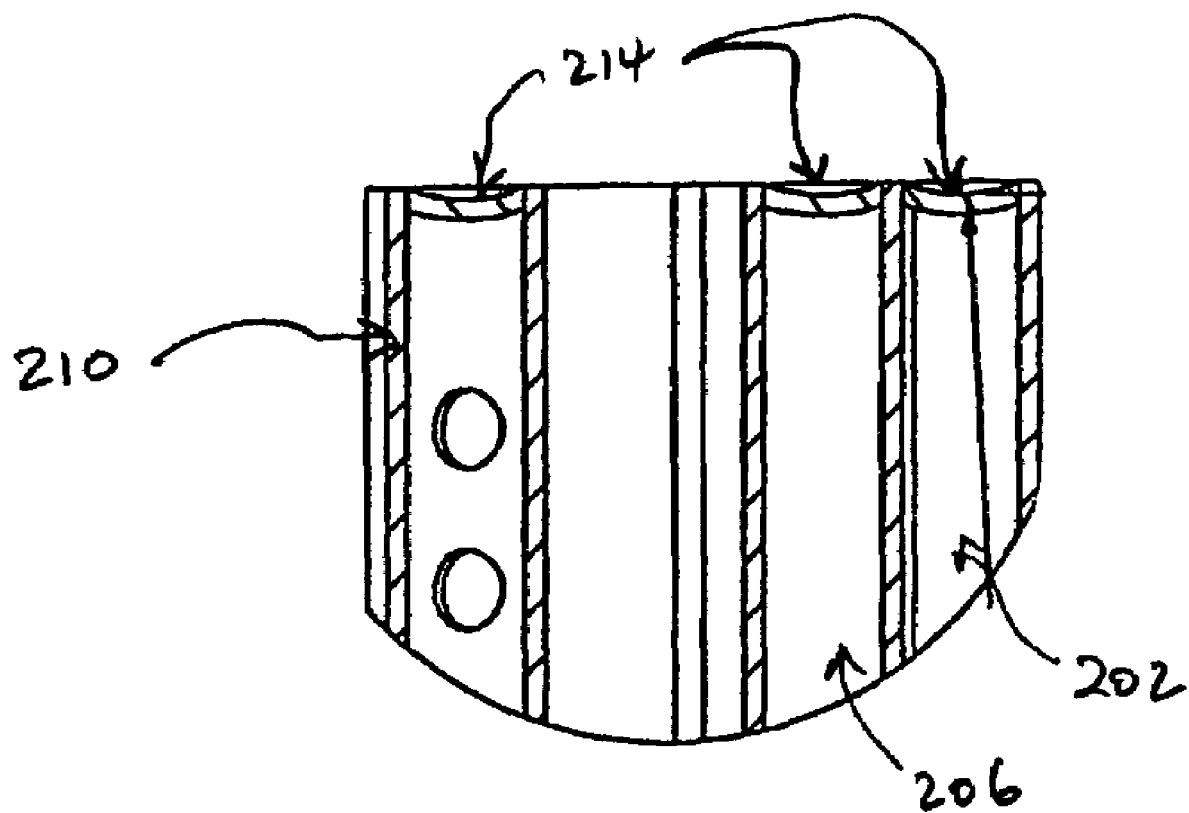
FIG. 7 is portion of a vertical cross-section along line VII—VII in FIG. 4.

The enclosure shown in the Figures may be formed by sheet material which are preferably lapwelded to the intake and exhaust manifold pipes as shown in FIGS. 5 and 6. The edges of the chambers may preferably be sealed with dished end caps (214) as shown in FIG. 7. The lap joints and dished end caps permit greater structural stability in light of the large thermal stresses the enclosure will experience during operation and during thermal cycles from an ambient temperature to an operating temperature and back.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

The invention claimed is:

1. A fuel cell stack enclosure which fully or partially encloses a fuel cell stack, comprising:

(a) at least three closed concentric cylindrical shells including an outer shell, an inner shell and at least one intermediate shell;

(b) wherein the outer shell and the at least one intermediate shell define a first annular chamber between them, and the inner shell and the at least one intermediate shell define a second annular chamber between them;

(c) an intake port defined by the outer shell for providing fluid communication from the exterior of the enclosure to the first annular chamber;

(d) a cross-over port defined by the intermediate shell for providing fluid communication between the first annular chamber and the second annular chamber;

(e) an outlet port defined by the inner shell for providing fluid communication between the second annular chamber and the interior space of the enclosure.

2. The enclosure of claim 1 wherein the intake port directs air tangentially into the first annular chamber.

3. The enclosure of claim 1 wherein the cross-over port is a vertically flattened oval.

4. The enclosure of claim 1 wherein the intake port and the cross-over port are located on opposing vertical ends of the enclosure.

5. The enclosure of claim 1 comprising three closed concentric shells.

6. The enclosure of claim 1 further comprising means for pumping air into the first annular chamber through the intake port.

7. The enclosure of claim 1 wherein the enclosure comprises two semi-cylindrical halves and further comprises means to pass fluids between the first annular chambers and second annular chambers respectively.

* * * * *